US008513548B2

(12) United States Patent  (10) Patent No.: US 8,513,548 B2
Rollet et al.  (45) Date of Patent: Aug. 20, 2013

(54) KEYPAD HAVING TAMPER-RESISTANT KEYS

(75) Inventors: Alain-Christophe Rollet, La Cadiere D'Azur (FR); Yann Loisel, La Ciotat (FR)

(73) Assignee: Maxim Integrated Products, Inc., San Jose, CA (US)

( * ) Notice: Subject to any disclaimer, the term of this patent is extended or adjusted under 35 U.S.C. 154(b) by 505 days.

(21) Appl. No.: 12/840,703

(22) Filed: Jul. 21, 2010

(65) Prior Publication Data

US 2012/0018288 A1 Jan. 26, 2012

(51) Int. Cl.
*H01H 9/26* (2006.01)
*H01H 13/72* (2006.01)
*H01H 13/76* (2006.01)

(52) U.S. Cl.
USPC ........................................ 200/5 A; 200/61.93

(58) Field of Classification Search
USPC .................................. 200/5 A, 61.93, 293
See application file for complete search history.

(56) References Cited

U.S. PATENT DOCUMENTS

| 3,676,607 | A | * | 7/1972 | Nash et al. ............... 379/361 |
| 2007/0152042 | A1 | | 7/2007 | Mittler |
| 2011/0215938 | A1 | * | 9/2011 | Neo et al. ................. 340/635 |

OTHER PUBLICATIONS

Diamond Electronics Ltd Technical Component Distribution; Rubber Keypad Designer's Guide; pp. 1-16.
PCI Security Standards Council, LLC; Pin Transaction Security; https://www.pcisecuritystandards.org/securitystandards/ped/index.php; 2006-2010.

* cited by examiner

*Primary Examiner* — Renee Luebke
*Assistant Examiner* — Lheiren Mae Caroc
(74) *Attorney, Agent, or Firm* — Advent, LLP

(57) ABSTRACT

A tamper resistant keypad includes one or more key assemblies having a resilient key member and a contact. The resilient key member is configured to flex when the key assembly is depressed to allow the contact to close a key press detection circuit on a circuit board to register a key press. A tamper detection switch assembly at least partially surrounds the resilient key member. The tamper detection switch assembly is configured to detect attempts to access the key assembly.

27 Claims, 4 Drawing Sheets

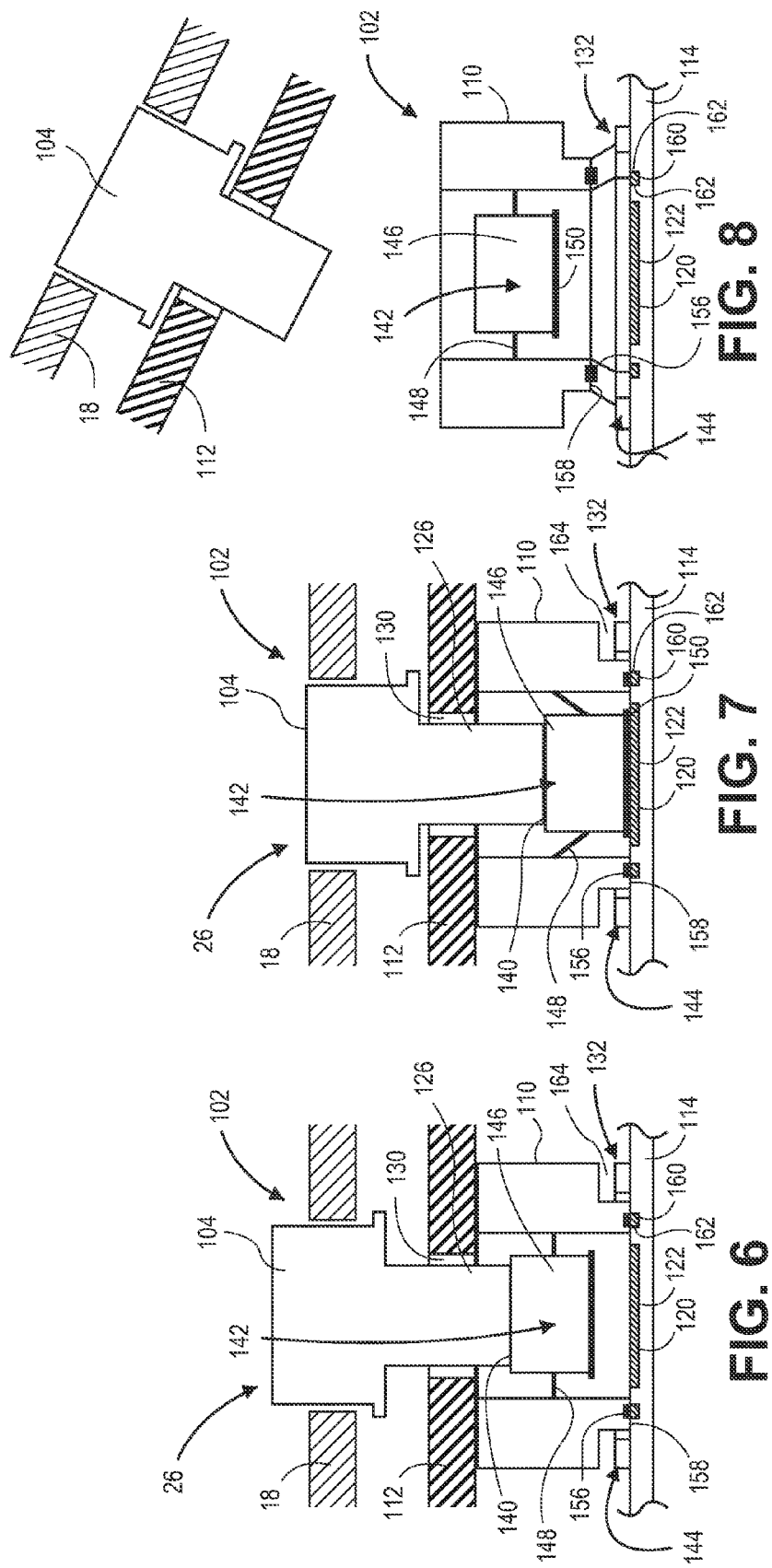

KEYPAD HAVING TAMPER-RESISTANT KEYS

BACKGROUND

Payment terminals including point of sale (POS) terminals, Automated Teller Machine (ATM) terminals, Automated Fuel Dispensers, and so on, allow financial transactions to be made using a plastic card such as a credit card, debit card, ATM card, smart card, or the like, issued to a cardholder. Typically, payment terminals are PIN entry devices (PED) that comprise a keypad to facilitate entry of a personal identification number (PIN) of the cardholder. The PIN is a numeric password entered by the cardholder on the payment terminal to authenticate the cardholder (by the card or by the issuer server). Thus, for example, a cardholder may enter a 4-digit PIN to authenticate his or her identity after using his or her credit card to make a purchase using a POS terminal.

Increasingly, payment terminals are subjected to physical attacks to obtain the PINs of cardholders who use the terminal. In one type of attack, the keypad of the payment terminal is penetrated (e.g., accessed or opened) and one or more small sensors, generally referred to as "bugs," are inserted beneath the keys. When a PIN is entered by a cardholder using the keypad, the bugs detect the key presses made by the cardholder and cause the PIN to be recorded. The PIN may then be used by the attacker or sold to a third party to access the cardholder's account data. Consequently, the Payment Card Industry (PCI) Security Standards Counsel has implemented a certification known as PCI-PTS PED (Payment Card Industry-Payment Terminal Security PIN entry device) certification for PEDs used in payment terminals so that the payment terminals may be made more resistant to such attacks.

SUMMARY

A keypad having tamper resistant keys is described. In implementations, the keypad includes one or more key assemblies that comprise a key member having a contact. The contact is configured to close a key press detection circuit on a circuit board when the key assembly is depressed to register a key press. A tamper detection switch assembly at least partially surrounds the key member. The tamper detection switch assembly is configured to detect attempts to penetrate the key assembly. In this manner, the keypad facilitates the detection of, and the provision of an active response to, a physical attack.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

Figure 2:
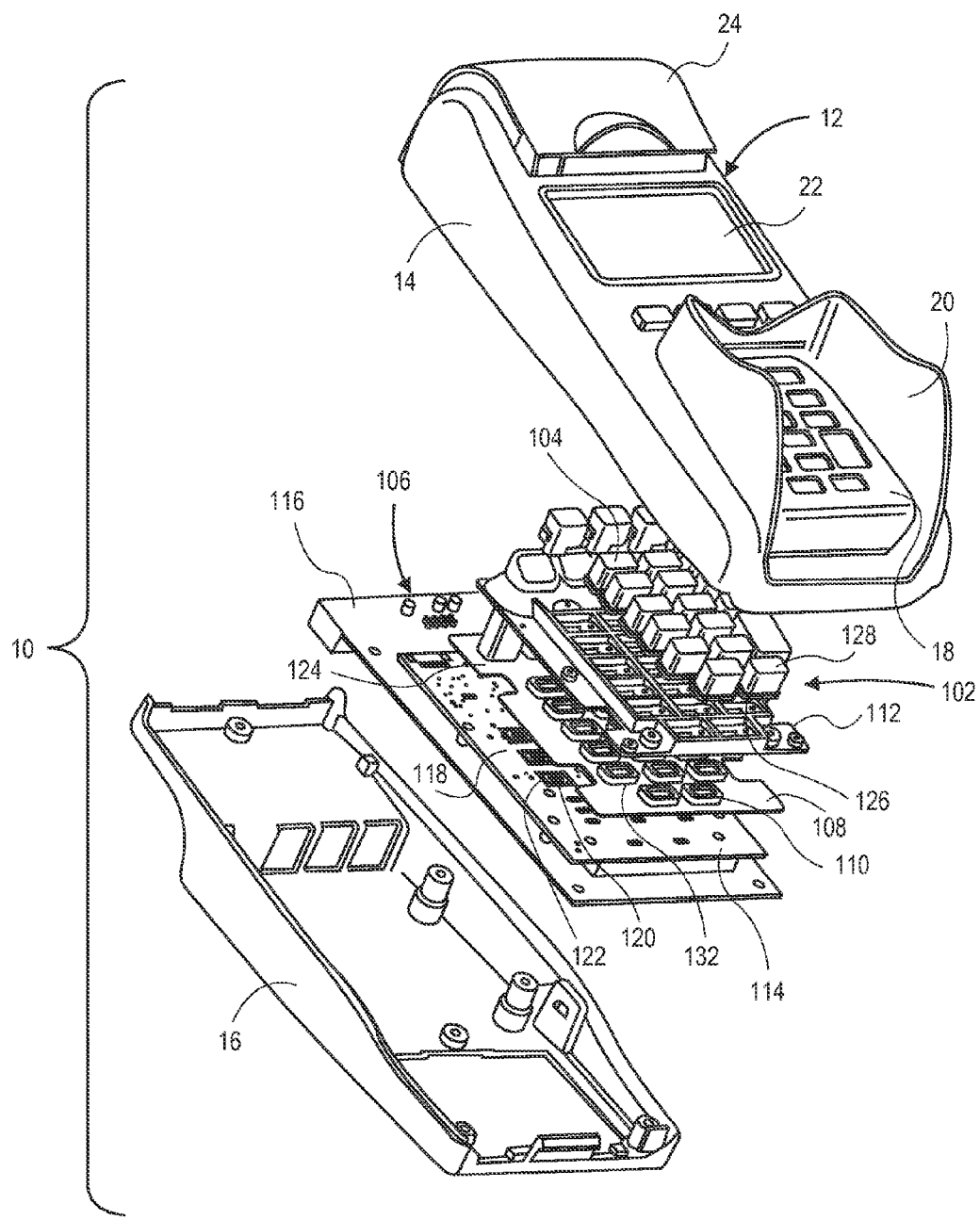
FIG. 2 is an exploded isometric view illustrating the keypad shown in FIG. 1.

FIGS. 6, 7, and 8 are side elevation views of a key assembly of the keypad shown in FIG. 2.

DETAILED DESCRIPTION

Overview

To receive PCI-PTS PED certification, PEDs are required to employ tamper detection and response mechanisms that cause the devices to become inoperable and result in the automatic erasure of sensitive data that may be stored in the device, such that it becomes infeasible to recover the sensitive data. These mechanisms protect against physical penetration of the device so that the insertion of a PIN-disclosing bug is difficult, e.g., so that there is no demonstrable way to disable or defeat the mechanism and insert the bug or gain access to secret information without requiring a predetermined attack potential score. Currently, a predetermined attack potential score of 25 points is required by the PCI Security Standards Counsel for PCI-PTS PED certification.

Keypads used in PEDs have in the past employed one or more blind switches, comprised of small mechanical switches embedded between the keypad's resilient key web and the keypad's printed circuit board (PCB) as a tamper detection mechanism. These blind switches detect when the keypad is opened. However, such blind switches are separate and distinct from the keys of the keypad. Thus, attack paths may still exist via open access through the keys to disable the security device without triggering the security device, or by disabling the security device without damaging the keys.

Accordingly, techniques are described for fabricating a keypad that includes tamper-resistant keys. The keypad is suitable for use in a PED to facilitate the detection of, and the provision of an active response to, a physical attack on the PED. In one or more implementations, the keypad includes a key mat that includes a plurality of resilient key members. The resilient key members are configured to flex when the key assembly is depressed to close a circuit on the circuit board to register the key press. One or more of the resilient key members are provided with a tamper detection switch assembly. The tamper detection switch assembly at least partially surrounds the resilient key member, and is configured to detect attempts to penetrate the key assembly (e.g., the resilient key member) by an attacker. The tamper detection switch assemblies thus provide enhanced protection of the key assemblies against physical penetration to prevent the insertion of a PIN-disclosing bug.

Example Implementations

FIGS. 1 through 8 illustrate an example payment terminal 10 that includes a keypad 100 employing tamper-resistant key assemblies in accordance with the present disclosure. The payment terminal 10 may be configured in a variety of ways. In the example implementation illustrated in FIGS. 1 and 2, the payment terminal 10 is configured as a POS terminal. However, it will be appreciated that the apparatus and techniques described herein are not necessarily limited to use in the depicted POS terminal, but instead may be employed by any device configured to receive confidential entries via a keypad or keyboard. For example, the keypad disclosed herein may be adapted for use in a wide variety of payment terminals configured to receive secure PIN information entered using a keypad. Examples of such terminals include, but are not limited to: POS terminals, ATM terminals, automated fuel dispensers, automated product dispensers, and automated card dispensers. Similarly, the keypad may be adapted for used by an access control system as an access control keypad. Other implementations are possible.

Figure 1:
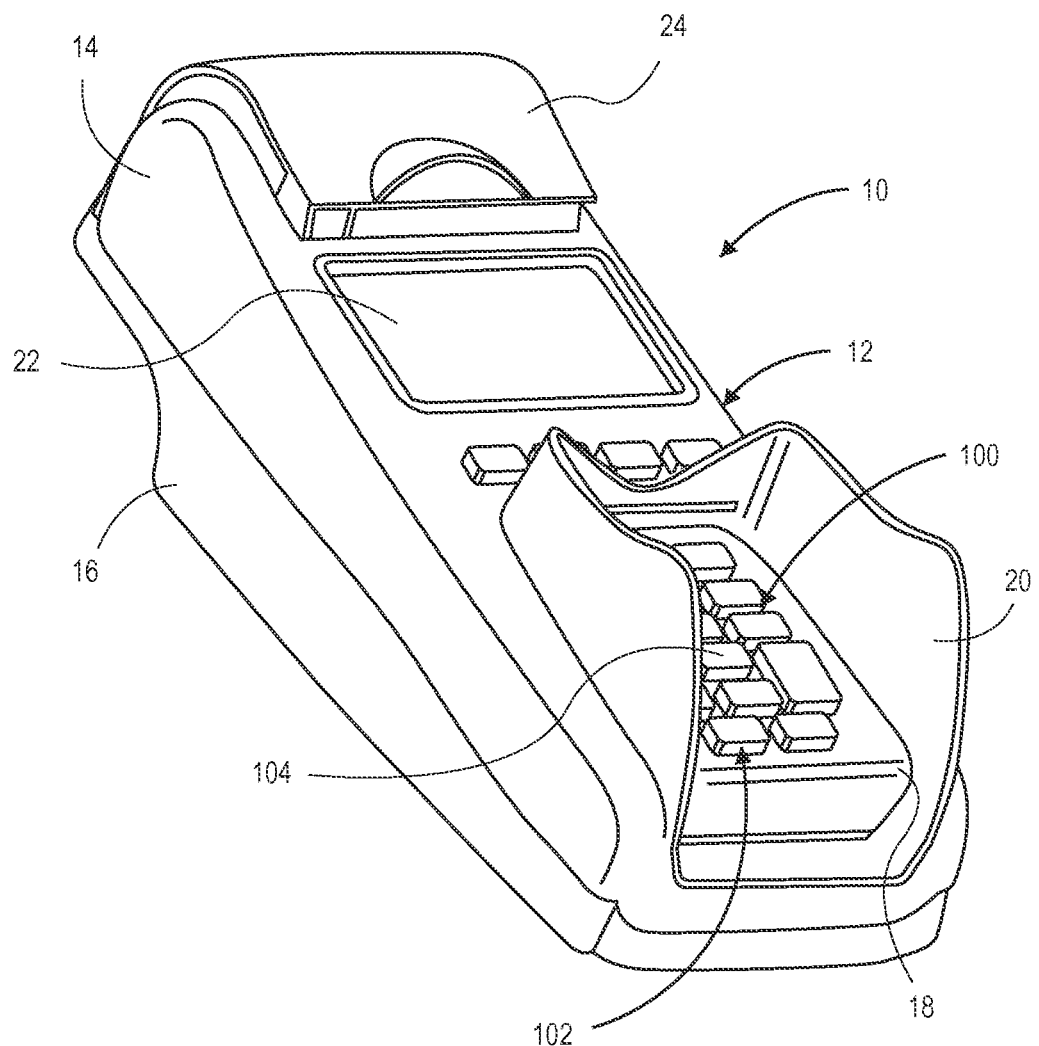
FIG. 1 is an isometric view illustrating a payment terminal in an example environment, wherein the payment terminal includes a keypad having tamper resistant keys in accordance with the present disclosure.

In FIG. 1, the payment terminal 10 is illustrated as including a casing 12, which, in the example shown, is configured in a clamshell arrangement that includes an upper casing portion 14 and a lower casing portion 16, which are joined together to enclose the various components of the payment terminal 10. As shown, the upper casing portion 14 includes a keypad faceplate 18. The keypad faceplate 18 may be integral with the upper casing portion 14 as shown, or may be a separate component attached to the upper casing portion 14. In embodiments, a PIN entry shield 20 may at least partially surround the keypad 100 to prevent viewing of the keypad 100 by third parties during entry of a PIN by a cardholder. The payment terminal 10 is further illustrated as including a display 22 and a printer assembly 24. It is contemplated that the payment terminal 10 may also include a variety of other components depending on the configuration of the terminal. For example, the payment terminal 10 may further include a magnetic stripe reader, an IC card reader, a processor, memory, a touch screen, various input/output (I/O) devices, and so on. Moreover, it is contemplated that not all of the components of the payment terminal 10 illustrated in FIG. 1 may be present in other implementations. For example, a payment terminal may be provided without a PIN entry shield 20 and printer assembly 24.

The keypad 100 of the payment terminal 10 is illustrated as including a plurality of key assemblies 102 having keys 104 arranged in a pattern configured for PIN entry (e.g., to be pressed by a cardholder to enter a PIN, make menu selections, enter other information, and so on). The keys 104 of the keypad 100 may be configured in a variety of ways. For example, the keypad 100 may include numeric keys "0" through "9" as well as keys configured to facilitate PIN entry, such as "ENTER", "CLEAR", "CANCEL", "DEBIT", "CREDIT", and so on. In some implementations, it is contemplated that the keypad 100 could also be configured as a keyboard and thus may include alphanumeric keys. Moreover, in some instances, keys 104 of the keypad 100 may be labeled in languages other than English, and/or by using non-English language characters. It is further contemplated that indicia (e.g., labeling) may be applied to the keypad faceplate 14 instead of, or in addition to, the keys 104.

As shown in FIG. 2, the keypad 100 may be comprised of a circuit board assembly 106, a key mat 108 having one or more resilient key members 110, a keypad chassis 112, and the plurality of keys 104. The circuit board assembly 106 includes a circuit board 114 supported within the casing 12 of the payment terminal 10 by a support bracket 116. In the implementation shown, the circuit board 114 is a printed circuit board (PCB) that includes a substrate 118 having one or more key press detection circuits 120 formed thereon, which are configured to be coupled to a keypad controller (not shown). The one or more key press detection circuits 120 are comprised of contact pads 122 positioned beneath the resilient key members 110 of the key mat 108.

The key mat 108 is disposed over the circuit board 114, and is retained against the circuit board 114 by the support bracket 116, which compresses the key mat 108 between the circuit board 114 and the keypad chassis 112. As illustrated, the key mat 108 includes a flexible web 124 that interconnects the resilient key members 110. In one or more embodiments, the key mat 108 (including the flexible web 124 and resilient key members 110) may be formed of a silicon rubber material. However, fabrication of the key mat 108 from other resilient materials such as natural rubber, a flexible plastic, and so on, is possible.

The various keys 104 of the key assemblies 102 comprise an inner portion 126 and a key cap portion 128. In the implementation illustrated, the inner portion 126 extends through apertures 130 formed in the keypad chassis 112 to engage the resilient key members 110, while the key cap portion 128 extends through corresponding apertures 26 formed in the keypad faceplate 18 of the upper casing portion 14 for access by a cardholder (see FIGS. 6 and 7). In FIG. 2, the keys 104 are illustrated as distinct components of the keypad 100. However, it is contemplated that the keys 104 and resilient key members 110 may be fabricated as integral components, or that the keys 104 may be fabricated or assembled as a component of the keypad chassis 112. Other configurations are possible.

Accordingly, the key assemblies 102 of the keypad 100 may generally be viewed as including a key 104, a resilient key member 110 of the key mat 108, and a contact pad 122 of a key press detection circuit 120 formed on the circuit board 114. When the key 104 of a key assembly 102 is depressed, the resilient key member 110 is configured to flex to engage the contact pad 122 disposed beneath it to close the respective key press detection circuit 120 on the circuit board 114 to register the key press (e.g., to provide a signal to the keypad controller). When the key 104 is released, the resilient key member returns to its pre-depressed configuration, disengaging the contact pad 122.

It is contemplated that, depending on design preferences, the resilient key member 110 may have a variety of configurations. In the implementation shown, the resilient key member 110 is formed as part of the key mat 108 of the keypad 100 so that the resilient key member is connected with other resilient key members 110 by flexible web 124. However, it is contemplated that each resilient key member 110 could be a distinct component, not joined by an interconnecting web 124. It is further contemplated that the keypad 100 could have two or more key mats 108, each having one or more resilient key members 110.

In accordance with the present disclosure, one or more of the key assemblies 102 may include a tamper detection switch assembly 132 that is integrated with the resilient key member 110 of the key assembly 102 and the circuit board 114. The tamper detection switch assembly 132 is configured to detect attempts to penetrate the key assembly 102 by an attacker, for example, by accessing the resilient key member 110 to insert a PIN-disclosing bug or like recording device between the resilient key member 110 and the circuit board 114. In implementations, the tamper detection switch assembly 132 may be configured to at least substantially surround the resilient key member 110 to inhibit access to the resilient key member 110 without detection. In this manner, the tamper detection switch assembly 132 makes physical penetration of the key assembly 102, e.g., for insertion of a PIN-disclosing bug, more difficult.

It is contemplated that any number and/or type of key assemblies 102 may be equipped with tamper detection switch assemblies 132 in accordance with the present disclosure. In one or more implementations, tamper detection switch assemblies 132 may be furnished for each key assembly 102 within the keypad 100. In other implementations, only selected key assemblies 102 of the keypad 100 may be equipped with a tamper detection switch assembly 132. For instance, in one example, key assemblies 102 having numeric keys 104 (e.g., keys 104 labeled "0", "1", "2", "3", "4", "5", "6", "7", "8", and/or "9") are equipped with tamper detection switch assemblies 132 since these key assemblies 102 are employed during PIN entry. Other key assemblies 102 within the keypad do not include tamper detection switch assemblies 132, since these keys are not utilized for entry of the digits of the PIN. In another example, the key assemblies 102 having keys 104 configured to facilitate PIN entry, such as "ENTER", "CLEAR", "CANCEL", "DEBIT", "CREDIT", and so on, may also be equipped with tamper detection switch assemblies 132. Conversely, in yet another example, only one or a limited number of key assemblies 102 (e.g., a key assembly 102 having a key 104 numbered "5") may be equipped with a tamper detection switch assembly 132. It is further contemplated that key assemblies 102 having alphanumeric keys 104 or keys labeled in languages other than English may be provided with tamper detection switch assemblies 132.

Figure 3:
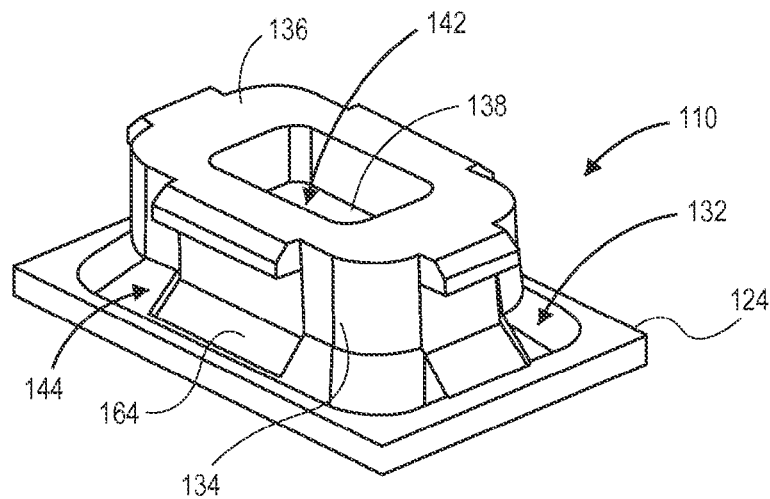
FIG. 3 is an isometric view illustrating a resilient key member of the keypad shown in FIG. 2.

FIG. 3 depicts a resilient key member 110 of a key assembly 102 within the keypad 100 shown in FIG. 2; further illustrating features of an example tamper detection switch assembly 132. As shown, the resilient key member 110 includes a body 134 having an upper face 136 configured to engage the keypad chassis 112 and a recess 138 sized and shaped to receive an end 140 of the inner portion 126 of a key 104. The body 134 includes a centrally disposed key dome assembly 142 and a tamper detection switch actuator 144, which at least partially surrounds the key dome assembly 142 along the base of the body 134. As shown, the tamper detection switch actuator 144 may be integral with the flexible web 124 interconnecting the resilient key members 110.

Figure 4:
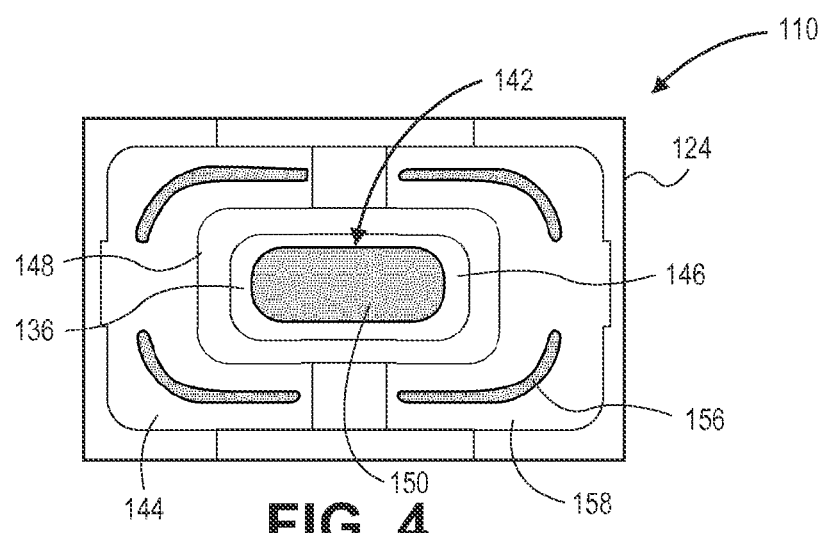
FIG. 4 is a bottom plan view of the resilient key member shown in FIG. 3.
Figure 5:
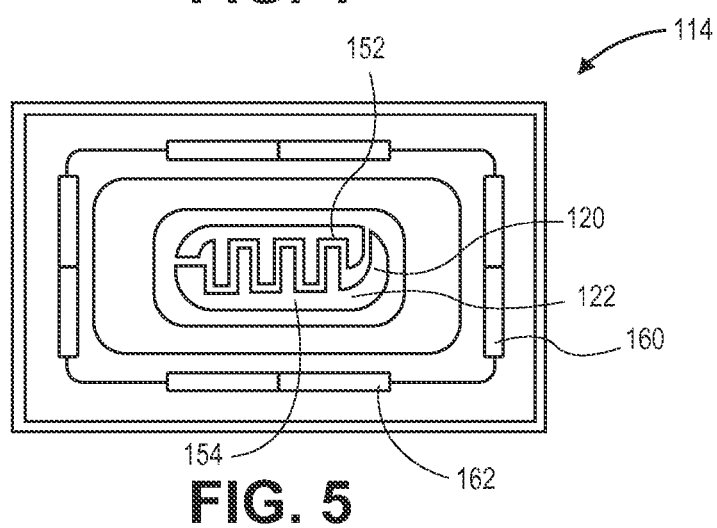
FIG. 5 is a top plan view illustrating a section of a circuit board of the keypad shown in FIG. 2.

The key dome assembly 142 includes a contact assembly 146 configured to be engaged by the end 140 of the inner portion 126 of the key 104. As shown in FIGS. 4 and 5, the contact assembly 146 is supported within the body 134 by a flexible membrane 148. As shown, the contact assembly 146 includes a contact 150 (FIG. 4) configured to be engaged with the contact pad 122 of the key press detection circuit 120 (FIG. 5). For example, in the implementation illustrated, the contact pad 122 includes separate, interlocking first and second circuit traces 152, 154 so that the key press detection circuit 120 is open. Engagement of the contact 150 with the contact pad 122 interconnects the circuit traces 152, 154 to close the key press detection circuit 120 registering the key press (e.g., furnishing a signal to the keypad controller). The flexible membrane 148 allows the contact assembly 146 to move downward when the key 104 is depressed so that the contact 150 may engage the circuit traces 152, 154 of the contact pad 122. The flexible membrane 148 then returns the contact assembly 146 to its non-depressed position when the key 104 is released so that the contact 150 is disengaged from the circuit traces 152, 154. In embodiments, the contact 150 may be formed of a conductor such as carbon (e.g., carbon ink printed on the surface of the contact assembly 146), a metal such as copper, aluminum, or the like, and so on.

In FIGS. 4 and 5, the tamper detection switch actuator 144 is illustrated as including one or more contact members 156 formed on the inner surface 158 of the body 134. In embodiments, the contact members 156, like the contact 150, may be formed of carbon such as carbon ink printed on the surface of the contact assembly 146, a metal such as copper, aluminum, or the like. The contact members 156 at least partially surround the contact 150 of the key dome assembly 142, and are configured to engage one or more circuit traces 160 of a tamper detection circuit 162 on the circuit board 114.

The tamper detections switches 132 may have a variety of configurations depending on application requirements. In the illustrated implementation, the tamper detection switch assembly 132 is illustrated as including the tamper detection switch actuator 144 of the resilient key member 110, the contact members 156, and/or the circuit traces 160 of the tamper detection circuit 162. More specifically, in the implementation shown, the tamper detection switch assembly 132 is illustrated as including four contact members 156, each generally like a letter "L." These contact members 156 are arranged about the key dome assembly 142 in a ring configuration. The circuit traces 160 of the tamper detection circuit 162 are likewise configured in a corresponding ring configuration about the contact pad 122 of the key press detection circuit 120. The contact members 156 may be offset from the circuit traces 160 so that the ends of each contact member 156 engages adjacent circuit traces 160 when the tamper detection switch actuator 144 is in the compressed shape to completely ring the key dome assembly 142 of the resilient key member 110. However, tamper detection switch assemblies 132 having other configurations (e.g., different numbers of contact members 156, contact members having different shapes, and so on) are possible. Moreover, in one or more implementations, tamper detection switch assemblies 132 may be employed having configurations where distinct contact members 156 are connected/associated to distinct tamper detection circuits 162, for the same tamper detection switch assembly 132. For example, the tamper detection switch assemblies 132 may include a plurality of contact members 156. Two or more of the contact members 156 may engage circuit traces 160 of distinct (e.g., separate) tamper detection circuits 162 when the tamper detection switch actuator 144 is in the compressed shape.

The tamper detection switch actuator 144 is compressed when the keypad 100 is assembled. In this manner, the tamper detection switch actuator 144 may hold the contact members 156 in engagement with the circuit traces 160 of a tamper detection circuit 162 on the circuit board 114. In response to an attempt to access the key assembly 102 (e.g., by disassembling the keypad 100, inserting apparatus between the key mat 108 and the circuit board 114, and so on), the tamper detection switch actuator 144 is configured to flex at least partially from the compressed shape to a released shape. In FIG. 3, the tamper detection switch actuator 144 is shown in its released shape. As illustrated, the tamper detection switch actuator 144 may include one or more perforations 164 spaced around the periphery of the key dome assembly 142 to allow the tamper detection switch actuator 144 to more readily flex when the tamper detection switch actuator 144 is held in the compressed shape. However, it is contemplated that, in some embodiments, such perforations 164 may not be provided.

FIGS. 6, 7, and 8 illustrate functionality of a key assembly 102 of the keypad shown in FIG. 2. In FIGS. 6 and 7, the contact assembly 146 of the key dome assembly 142 is engaged by the end 140 of the inner portion 126 of the key 104 of the key assembly 102. The contact assembly 146 is supported within the body 134 by the flexible membrane 148. The flexible membrane 148 allows the contact assembly 146 (and contact 150) to move within the body 134 and tamper detection switch actuator 144 in a direction normal to the surface of the circuit board 114 (e.g., toward or away from the circuit board 114) when the key 104 of the key assembly 102 is depressed. FIG. 6 illustrates the key assembly 102 at rest prior to or following a key press (e.g., prior to or following the key 104 being pressed by a cardholder during PIN entry). As shown, the flexible membrane 148 holds the contact assembly 146 in a non-depressed position, wherein the contact 150 is disengaged from the circuit traces 152, 154 of the key press detection circuit. FIG. 7 illustrates the key assembly 102 during a key press event (e.g., while the key 104 of the key assembly 102 is being pressed by a cardholder). As shown, pressing of the key 104 causes the key 104 and contact assembly 146 to move toward the circuit board 114. The flexible membrane 148 allows the contact assembly 146 to move downward when the key 104 is depressed so that the contact 150 may engage the circuit traces 152, 154 of the contact pad 122. Engagement of the contact 150 with the contact pad 122 interconnects the circuit traces 152, 154 to close the circuit 120 registering the key press (e.g., furnishing a signal to the keypad controller).

FIGS. 6 and 7 illustrate the key assembly 102 during normal PIN entry (e.g., no attempt to penetrate the key assembly 102 has been detected by the tamper detection switch assembly 132). As shown, the resilient key member 110 is retained between the circuit board 114 and the keypad chassis 112 so that the tamper detection switch actuator 144 is compressed against the circuit board 114. The tamper detection switch actuator 144 thus attains a compressed shape to hold the contact members 156 in engagement with the circuit traces 160 of a tamper detection circuit 162. Engagement of the contact members 156 with the circuit traces 160 causes the tamper detection circuit 162 to remain closed; furnishing an indication that keypad 100 has not been subject to detectable tampering.

FIG. 8 illustrates the key assembly 102 following an attempt to penetrate the keypad 100 (FIGS. 1 and 2) to access the key assembly 102. In FIG. 8, the circuit board 114 has been separated (e.g., removed) from the keypad chassis 112 (and/or keypad faceplate 18). The key 104 is also illustrated as being withdrawn from engagement with the contact assembly 150. As shown, the tamper detection switch actuator 144 is flexed from the compressed shape, shown in FIGS. 6 and 7, to a released shape. When in the released shape, the tamper detection switch actuator 144 at least partially, and in some instances fully, disengages the contact members 156 from the circuit traces 160. This disengagement causes the tamper detection circuit 162 to be opened, furnishing an indication that the key assembly 102 may have been penetrated and the security of the keypad 100 may have been compromised. Disengagement of the contact members 156 from the circuit traces 160 may also cause variation in the impedance and/or resistance of the tamper detection circuit 162. This variation of impedance and/or resistance may be detected as an indication that the key assembly 102 may have been penetrated. Moreover, it is contemplated that the tamper detection circuit 162 may be configured so that disengagement of the contact members 156 from the circuit traces 160 causes a short circuit, indicating that the key assembly 102 may have been penetrated.

The keypad 100 may be configured to be operable with a variety of tamper detection controllers in various payment terminals 10, which may be adapted to employ the keypad 100. Such tamper detection controllers may employ a variety of penetration detection techniques including, but not limited to, dynamic random signal modification, random scanning of tamper detection switch assemblies 132, and so on. The use of individual tamper detection switch assemblies 132 facilitates the use of multiple tamper detection circuits 162 which may employ a variety of routing schemes. For example, in an example keypad 100, the circuit traces 162 within key assemblies 102 having keys 104 labeled "1", "4", and "7" may be routed onto a first tamper detection circuit 162, while the circuit traces 162 within key assemblies 102 having keys 104 labeled "2", "5", and "8" are routed onto a second tamper detection circuit 162, and the circuit traces 162 within key assemblies 102 having keys 104 labeled "0", "3", "6", and "9" are routed onto a third tamper detection circuit 162. However, a variety of routing schemes are possible. Moreover, the routing schemes employed by any two keypads 102 in a particular terminal implementation may be randomly varied making penetration of the keypads by an attacker more difficult. Thus, a first keypad 100 in a particular terminal implementation may employ the routing scheme described above, while a second keypad may employ a routing scheme wherein the circuit traces 162 within key assemblies 102 having keys 104 labeled "0", "1", "2", and "3" are routed onto a first tamper detection circuit 162, the circuit traces 162 within key assemblies 102 having keys 104 labeled "4", "5", and "6" are routed onto a second tamper detection circuit 162, and the circuit traces 162 within key assemblies 102 having keys 104 labeled "7", "8", and "9" are routed onto a third tamper detection circuit 162. Other examples are possible. In some implementations, such routing schemes may employ multiple circuit boards 114.

It is contemplated that attempts to access the key assemblies within a PED keypad may involve various types of attacks. For example, attempts to access the key assembly may include, but are not limited to: disassembling the keypad, inserting apparatus between the key mat and the circuit board, or injecting a foreign substance or device within the keypad. The keypad 100 described herein may provide enhanced protection against such physical penetration attacks so that the insertion of a PIN-disclosing bug within the key assemblies 102 of the keypad 100 is made more difficult. For example, in various implementations, the keypad 100 can be provided with multiple tamper detection mechanisms (e.g., the number of tamper detection mechanisms is equal to the number of key assemblies 102 equipped with tamper detection switch assemblies 132). Consequently, in some instances, the techniques described herein may allow the design of the casing 12 of the payment terminal 10 to be simplified, since some attack routes are eliminated.

As noted, PCI-PTS PED certification requires that there is no demonstrable way to disable or defeat the mechanism and insert the bug or gain access to secret information without requiring a predetermined attack potential score (e.g., an attack potential score of 25 points). The implementation of the tamper detection switch assemblies 132 within individual key assemblies 102 of the keypad may increase the attack potential score of the PED. In one example, a keypad 100 employing key assemblies 102 in accordance with the present disclosure was determined to increase the attack potential score by 4 points in comparison to keypads employing blind switches. Moreover, the user of multiple routing schemes was determined to increase the attack potential score for the keypad by an additional 2 points.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A keypad comprising:
 a circuit board having a key press detection circuit; and
 a key assembly comprising:
  a key member having a contact configured to close the key press detection circuit to register a key press; and
  a tamper detection switch assembly at least partially surrounding the contact, the tamper detection switch assembly configured to detect an attempt to access the key assembly, wherein the tamper detection switch assembly comprises an actuator at least partially surrounding the key member, the actuator configured to at least partially flex from a compressed shape to a released shape in response to an attempt to access the key assembly.

2. The keypad as recited in claim 1, wherein the tamper detection switch assembly further comprises a contact member, the actuator configured to hold the contact member in engagement with a tamper detection circuit on the circuit board when the actuator is in the compressed shape.

3. The keypad as recited in claim 2, wherein the actuator is configured to release the contact member from engagement with the tamper detection circuit on the printed circuit board when the actuator is in the released shape.

4. The keypad as recited in claim 3, wherein the release of the contact member opens the tamper detection circuit.

5. The keypad as recited in claim 3, wherein the release of the contact member changes the impedance in the tamper detection circuit.

6. The keypad as recited in claim 1, wherein the resilient key member comprises a key dome assembly having a contact assembly including the contact, the contact assembly moving within the actuator when the key dome assembly is depressed.

7. The keypad as recited in claim 1, further comprising a chassis, the actuator configured to be compressed against the circuit board by a keypad chassis so that the actuator is held in the compressed shape and to flex to the released shape when the circuit board is at least partially removed from the keypad chassis.

8. The keypad as recited in claim 7, wherein the keypad chassis comprises a key aperture and wherein the keypad assembly comprises a key engaged with the resilient key member and configured to extend through the aperture.

9. The keypad as recited in claim 1, wherein the key member is resilient.

10. The keypad as recited in claim 9, wherein the key member is configured to flex when the key assembly is depressed to allow the contact to close the key press detection circuit.

11. The keypad as recited in claim 1, wherein the tamper detection switch assembly is integral with the key member.

12. A keypad comprising:
a circuit board; and
a key mat comprising:
    a plurality of key members, each of the key members configured to close a circuit on the circuit board; and
    a plurality of tamper detection switch assemblies operable to detect an attempt to penetrate the keypad, each of the plurality of tamper detection switch assemblies configured to at least partially surround a key member, wherein the tamper detection switch assemblies comprise an actuator at least partially surrounding the key member, the actuator configured to at least partially flex from a compressed shape to a released shape.

13. The keypad as recited in claim 12, wherein the tamper detection switch assemblies further comprise a contact member, the actuator configured to hold the contact member in engagement with a tamper detection circuit on the circuit board when the actuator is in the compressed shape.

14. The keypad as recited in claim 13, wherein the keypad further comprises a plurality of keys, each of the plurality of keys in engagement with a key member.

15. The keypad as recited in claim 14, wherein the actuator is configured to release the contact member from engagement with the tamper detection circuit when the actuator member is in the released shape.

16. The keypad as recited in claim 15, wherein the release of the contact member opens the tamper detection circuit.

17. The keypad as recited in claim 15, wherein the release of the contact member changes the impedance in the tamper detection circuit.

18. The keypad as recited in claim 15, further comprising a chassis, the actuator configured to be compressed between the chassis and the circuit board so that the actuator is held in the compressed shape and to flex to the expanded shape when the circuit board is at least partially removed from the chassis.

19. The keypad as recited in claim 12, wherein the tamper detection switch assemblies further comprise a plurality of contact members, at least two of the contact members engaging distinct tamper detection circuits on the circuit board when the actuator is in the compressed shape.

20. The keypad as recited in claim 12, wherein the key member is resilient.

21. The keypad as recited in claim 20, wherein the key member is configured to flex when the key assembly is depressed to allow the contact to close the key press detection circuit.

22. The keypad as recited in claim 12, wherein the tamper detection switch assembly is integral with the key member.

23. A payment terminal comprising:
a chassis;
a keypad disposed in the chassis, the keypad comprising:
    a circuit board having a key press detection circuit; and
    a key assembly comprising:
        a key member and a contact, the contact configured to close the key press detection circuit to register a key press; and
        a tamper detection switch assembly at least partially surrounding the key member, the tamper detection switch assembly configured to detect an attempt to access the key assembly, wherein the tamper detection switch assemblies comprise an actuator at least partially surrounding the key member and a contact member, the actuator operable to flex between a compressed shape and an expanded shape, wherein the actuator is configured to hold the contact member in engagement with a tamper detection circuit on the circuit board when the actuator is in the compressed shape.

24. The keypad as recited in claim 23, wherein the actuator is configured to flex to the expanded shape during an attempt to access the key assembly so that the contact member at least partially disengaged from the tamper detection circuit.

25. The terminal as recited in claim 23, wherein the key member is resilient.

26. The terminal as recited in claim 25, wherein the key member is configured to flex when the key assembly is depressed to allow the contact to close the key press detection circuit.

27. The keypad as recited in claim 23, wherein the tamper detection switch assembly is integral with the key member.

* * * * *